(12) United States Patent
Nakamura et al.

(10) Patent No.: US 10,604,005 B2
(45) Date of Patent: Mar. 31, 2020

(54) PIPE ATTACHING STRUCTURE OF FUEL TANK

(71) Applicant: FTS CO., LTD., Toyota, Aichi Prefecture (JP)

(72) Inventors: Akihiko Nakamura, Toyota (JP); Yasunari Isomura, Toyota (JP); Kiyotaka Tsukidate, Toyota (JP)

(73) Assignee: FTS CO., LTD., Toyota, Aichi Prefecture (JP)

( * ) Notice: Subject to any disclaimer, the term of this patent is extended or adjusted under 35 U.S.C. 154(b) by 0 days.

(21) Appl. No.: 16/012,605

(22) Filed: Jun. 19, 2018

(65) Prior Publication Data

US 2018/0370349 A1 Dec. 27, 2018

(30) Foreign Application Priority Data

Jun. 27, 2017 (JP) .................. 2017-124762

(51) Int. Cl.
*B60K 15/03* (2006.01)
*B60K 15/01* (2006.01)
(Continued)

(52) U.S. Cl.
CPC ...... *B60K 15/03177* (2013.01); *B60K 15/013* (2013.01); *F16L 21/00* (2013.01);
(Continued)

(58) Field of Classification Search
CPC ............ B60K 15/013; B60K 15/03177; B60K 2015/03493; B29L 2031/7172; F16L 21/00
(Continued)

(56) References Cited

U.S. PATENT DOCUMENTS

| 6,357,617 B1 * | 3/2002 | Kido | B60K 15/03177 |
| | | | 220/562 |
| 2003/0029871 A1 * | 2/2003 | Goto | 220/562 |

(Continued)

FOREIGN PATENT DOCUMENTS

| JP | 2011-529820 A | 12/2011 |
| JP | 2012-162244 A | 8/2012 |
| JP | 2014-043267 A | 3/2014 |

*Primary Examiner* — Zachary T Dragicevich
(74) *Attorney, Agent, or Firm* — McGinn I.P. Law Group, PLLC.

(57) ABSTRACT

In a pipe attaching structure of a fuel tank, a pipe attachment section and the fuel tank are molded simultaneously, and the pipe attachment section can be securely molded. In the pipe attaching structure of the fuel tank, which is provided with a pipe attachment section adapted to attach pipes to an exterior wall of the fuel tank, the fuel tank has the pipe attachment section elongating from the exterior wall of the fuel tank outwardly of the fuel tank so as to be integral therewith. The pipe attachment section has an attaching exterior wall composed of the same material with that of the exterior wall of the fuel tank so as to elongate into a cylindrical configuration and continue integrally with the exterior wall of the fuel tank outwardly thereof, and an attaching interior wall formed inside the attaching exterior wall so as to continue from a tip end of the attaching exterior wall and bend like a hairpin, and the attaching exterior wall and the attaching interior wall are brought into contact with each other.

19 Claims, 4 Drawing Sheets

(51) Int. Cl.
  *F16L 21/00* (2006.01)
  *F16L 41/08* (2006.01)
  *B29L 31/00* (2006.01)
  *B29C 49/22* (2006.01)

(52) U.S. Cl.
  CPC ............ *F16L 41/082* (2013.01); *B29C 49/22* (2013.01); *B29L 2031/7172* (2013.01); *B60K 2015/03046* (2013.01); *B60K 2015/03493* (2013.01)

(58) Field of Classification Search
  USPC ........ 285/201, 202; 220/86.2, 562; 222/569, 222/570, 572, 574
  See application file for complete search history.

(56) References Cited

U.S. PATENT DOCUMENTS

2004/0009315 A1\* 1/2004 Potter .............. B60K 15/03177
2014/0209616 A1\* 7/2014 Balzer .......................... 220/562

\* cited by examiner

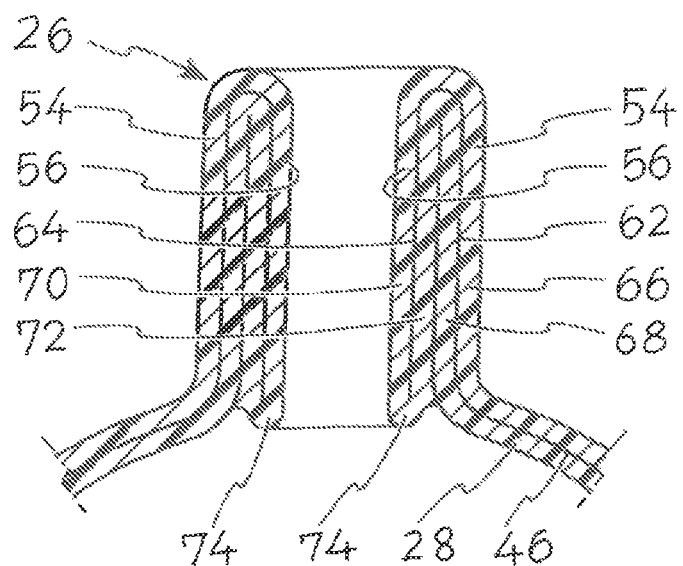
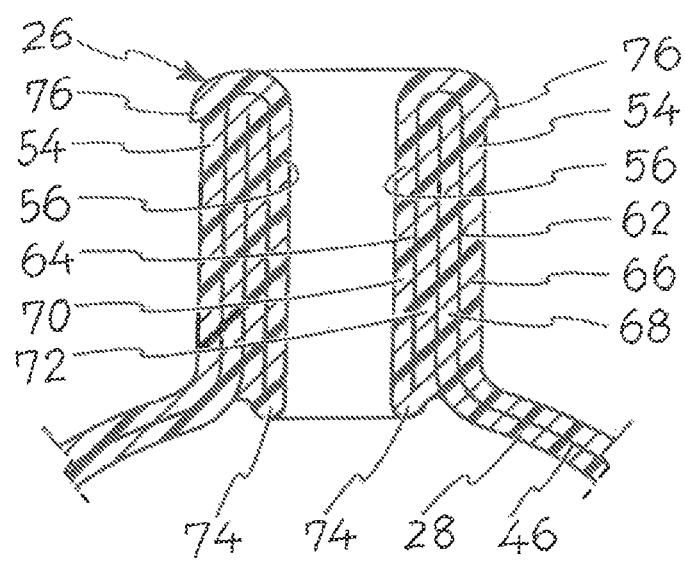

PIPE ATTACHING STRUCTURE OF FUEL TANK

CROSS-REFERENCE TO RELATED APPLICATIONS

This application is related to and claims priority from Japanese patent application No. 2017-124762, incorporated herein by reference.

BACKGROUND OF THE INVENTION

1. Field of the Invention

The present invention relates to a pipe attaching structure of a fuel tank, which is provided with a pipe attachment member adapted to attach pipes to an exterior wall of the fuel tank composed of a synthetic resin.

2. Description of Related Art

Conventionally, tubular blow molded products such as fuel tanks for motor vehicles, etc. have been formed of metal. But, recently, the tubular blow molded products composed of a thermoplastic synthetic resin have been frequently used, because vehicles bodies are light-weight and free from rust, and readily formed into desired configurations.

In many cases, tubular fuel tanks composed of the thermoplastic synthetic resin have been produced with the blow molding method, because tubular bodies can be readily formed. With the blow molding method, a parison composed of a molten thermoplastic synthetic resin is extruded from a die head (not shown) into a cylindrical configuration, and air is blown into the parison while holding the parison with the mold, thereby producing the fuel tanks.

As shown in FIG. 2, pipe attachment members 10 adapted to attach pipes and various tubes have been provided in an exterior wall 12 of a fuel tank 14. The pipe attachment members 10 are formed of members separately from that of the exterior wall 12 of the fuel tank 14, and attached to the exterior wall 12 after molding of the fuel tank 14. In this case, it has been required to mold the pipe attachment members 10 separately, and attach the pipe attachment members 10 to the exterior wall 12 of the fuel tank 14. Consequently, these works take time and labor.

As shown in FIG. 1, an exterior wall 16 is molded by blowing a fuel tank 18, and at the same time, a pipe attachment member 20 is molded in a blowing mold 22 (see Japanese Unexamined Patent Application Publication No. 2012-162244, for example.). In this case, a core member 24 adapted to mold the pipe attachment member 20 is provided in the blowing mold 22, and a pipe attaching molding section adapted to mold the pipe attachment member 20 is provided in the core member 24. When blow molding, the parison is injected into the pipe attaching molding section adapted to mold the pipe attachment member 20 of the core member 24.

A gap in the pipe attaching molding section adapted to mold the pipe attachment member 20 is narrow so that the parison is insufficiently filled in a cylindrical or bellow-like tip end thereof, whereby the configuration of a tip end of the pipe attachment member 20 may be broken off.

SUMMARY OF THE INVENTION

Accordingly, it is an object of the present invention to provide a pipe attaching structure of a fuel tank, which is provided with a pipe attachment member adapted to attach pipes to an exterior wall of the fuel tank, capable of molding the pipe attachment member along with the fuel tank, and securely molding the pipe attachment member.

According to a first aspect of the present invention, in a pipe attaching structure of a fuel tank, which is provided with a pipe attachment section adapted to attach pipes to an exterior wall of the fuel tank, wherein the fuel tank has a pipe attachment section extending outwardly of the fuel tank so as to be integral with the exterior wall of the fuel tank, the pipe attachment section includes an attaching exterior wall composed of the same material with that of the exterior wall of the fuel tank so as to elongate into a cylindrical configuration and continue integrally with the exterior wall of the fuel tank outwardly thereof, and an attaching interior wall formed inside the attaching exterior wall so as to continue from a tip end of the attaching exterior wall and bend like a hairpin, and the attaching exterior wall and the attaching interior wall are brought into contact with each other.

With the arrangement of the first aspect of the present invention, in the pipe attaching structure of a fuel tank, which is provided with the pipe attachment section adapted to attach pipes to the exterior wall of the fuel tank, the fuel tank has the pipe attachment section extending outwardly of the fuel tank so as to be integral with the exterior wall of the fuel tank. As a result, the pipe attachment section can be formed with the molding of the fuel tank, the number of components can be reduced, and the producing steps of the fuel tank can be shortened.

The pipe attachment section includes the attaching exterior wall composed of the same material with that of the exterior wall of the fuel tank so as to elongate into a cylindrical configuration and continue integrally with the exterior wall of the fuel tank outwardly thereof, and the attaching interior wall formed inside the attaching exterior wall so as to continue from the tip end of the attaching exterior wall and bend like a hairpin. As a result, no gap exists between the exterior wall of the fuel tank and the pipe attachment section so as not to generate any fuel leakage, etc. The pipe attachment section can produce a double structure composed of the attaching exterior wall and the attaching interior wall, thereby preventing fuel permeation from parts of the pipe attachment section, improving the rigidity of the pipe attachment section, and strongly attaching the pipes, etc.

As the attaching exterior wall and the attaching interior wall of the pipe attachment section are formed into close contact with each other, the rigidity of the pipe attachment section can be improved, and the pipes, etc. can be strongly attached without preventing any gap from generating between the attaching exterior wall and the attaching interior wall, and the fuel from permeating from the gap between the attaching exterior wall and the attaching interior wall.

According to a second aspect of the present invention, the wall thickness of the total of the attaching exterior wall and the attaching interior wall of the pipe attachment section is thinner than twice of the wall thickness of the exterior wall of the fuel tank.

With the arrangement of the second aspect of the present invention, the wall thickness of the total of the attaching exterior wall and the attaching interior wall of the pipe attachment section is thinner than twice of the wall thickness of the exterior wall of the fuel tank. When the pipe attachment section is formed, the attaching exterior wall and the attaching interior wall are strongly brought into close contact with each other, thereby reducing the wall thickness thereof, and the rigidity of the pipe attachment section can be improved. In addition, the internal diameter of the pipe attachment section can be enlarged to widen the flow path thereof.

According to a third aspect of the present invention, a tip end of an interior side of the fuel tank of the attaching interior wall protrudes inwardly of the fuel tank from an inner surface of the exterior wall of the fuel tank.

With the arrangement of the third aspect of the present invention, the tip end of the interior side of the fuel tank of the attaching interior wall protrudes inwardly of the fuel tank from the inner surface of the exterior wall of the fuel tank. Therefore, the rigidity of a continual part between the pipe attachment section and the exterior wall of the fuel tank can be improved, and fluid flowing inside the pipe attachment section can be smoothly flowed into the fuel tank.

According to a fourth aspect of the present invention, the attaching exterior wall of the pipe attachment section has a spool of the attaching exterior wall, which protrudes in a direction of an external diameter of the attaching exterior wall in a periphery thereof.

With the arrangement of the fourth aspect of the present invention, the attaching exterior wall of the pipe attachment section has the spool of the attaching exterior wall, which protrudes in the direction of the external diameter of the attaching exterior wall in the periphery thereof so that when pipe members such as filler pipes, etc. are attached to the pipe attachment section, the pipe members can be prevented from coming off the pipe attachment section.

According to a fifth aspect of the present invention, the exterior wall of the fuel tank has a multi-layer structure of synthetic resins, and has a barrier layer inside the exterior wall of the fuel tank.

With the arrangement of the fifth aspect of the present invention, the exterior wall of the fuel tank has the multi-layer structure of synthetic resins, and has the barrier layer inside the exterior wall of the fuel tank so that the rigidity and durability of the fuel tank can be improved, and fuel can be prevented from being permeated from the exterior wall of the fuel tank.

According to a sixth aspect of the present invention, the attaching exterior wall and the attaching interior wall of the pipe attachment section respectively have a barrier layer inside each of the attaching exterior wall and the attaching interior wall.

With the arrangement of the sixth aspect of the present invention, the attaching exterior wall and the attaching interior wall of the pipe attachment section respectively have a barrier layer inside each of the attaching exterior wall and the attaching interior wall so that fuel can be securely prevented from being permeated outwardly of the pipe attachment section.

The pipe attachment section has the attaching exterior wall composed of the same material with that of the exterior wall of the fuel tank so as to elongate into a cylindrical configuration and continue integrally with the exterior wall of the fuel tank outwardly thereof, and the attaching interior wall formed inside the attaching exterior wall so as to continue from a tip end of the attaching exterior wall and bend like a hairpin. Therefore, the attaching exterior wall and the attaching interior wall of the pipe attachment section can define a double structure so that fuel can be prevented from permeating from a part of the pipe attachment section, the rigidity thereof can be improved, and the pipes, etc. can be strongly attached thereto.

Other objects, features, and characteristics of the present invention will become apparent upon consideration of the following description and the appended claims with reference to the accompanying drawings, all of which form a part of this specification.

BRIEF DESCRIPTION OF THE DRAWINGS

FIG. 4 is an enlarged cross-sectional view of a part of a pipe attachment section used in the embodiment of the present invention;

FIG. 5 is an enlarged cross-sectional view of a part of a pipe attachment section used in another embodiment of the present invention.

DETAILED DESCRIPTION OF THE PREFERRED EMBODIMENTS

Hereinafter, in the embodiment of the present invention, a pipe attaching structure of a fuel tank, which is provided with pipe attachment sections 26 adapted to attach pipes to an exterior wall 28 of a fuel tank 30 will be explained with reference to FIGS. 2 through 6. The pipe attachment sections 26 for attaching filler pipes (not shown) adapted to refuel into the fuel tank 30 will be explained, for example. The pipe attachment sections 26 for attachment to other pipes may be used.

Figure 1:
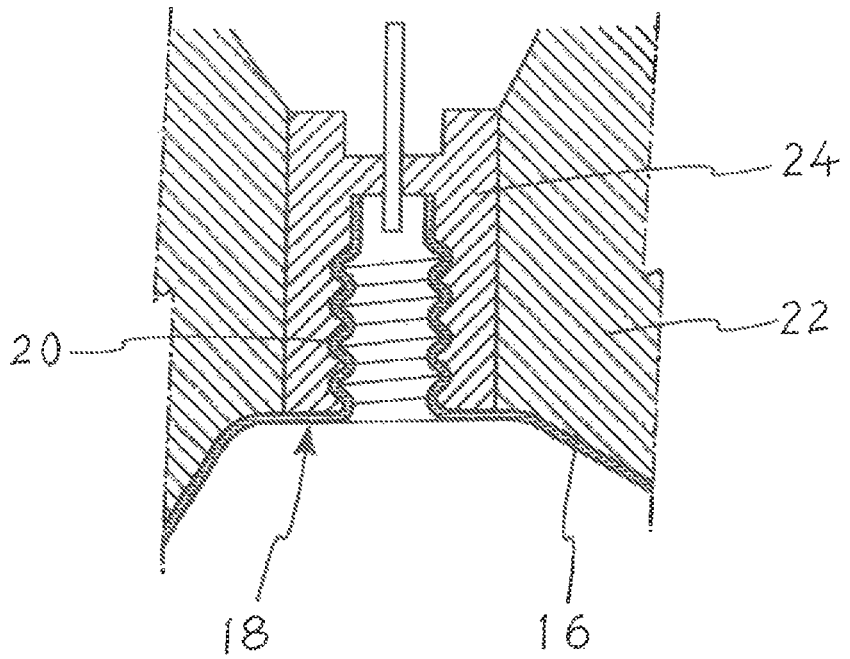
FIG. 1 is a cross-sectional view of a molded part of a pipe attachment section of a blowing mold adapted to produce a conventional pipe attachment section.
Figure 2:
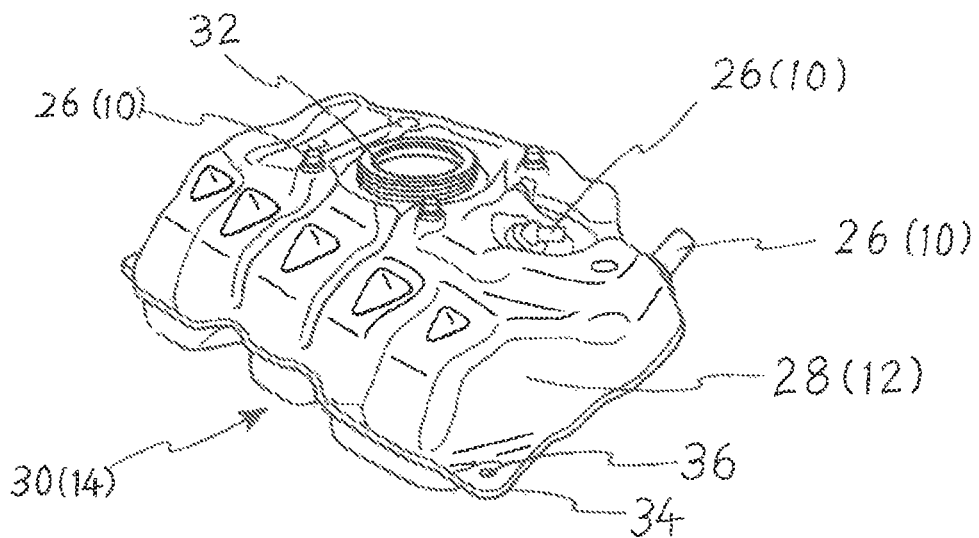
FIG. 2 is a perspective view of a fuel tank used in an embodiment of the present invention.

FIG. 2 shows a perspective view of the fuel tank 30 produced with a blow molding method in the embodiment of the present invention.

As shown in FIG. 2, in the embodiment of the present invention, the fuel tank 30 produced by a blow molding device, a pump unit attachment aperture 32 adapted for inserting and removing a fuel pump (not shown), etc. is formed on an upper surface of the fuel tank 30. In addition, the pipe attachment sections 26 for refueling from filler pipes (not shown) are formed on a side surface or the upper surface of the fuel tank 30.

An external rib 34 is provided in a circumference of the fuel tank 30 over the entire periphery thereof, and several attachment apertures 36 are formed in predetermined positions of corners, etc. of the external rib 34. And by fastening bolts between the attachment apertures 36 and a vehicle body, the fuel tank 30 is attached to the vehicle body.

Furthermore, various pipe attachment sections 26 connected to hoses, etc. adapted to recover fuel vapor inside the fuel tank 30 are formed on the upper surface thereof.

Figure 3:
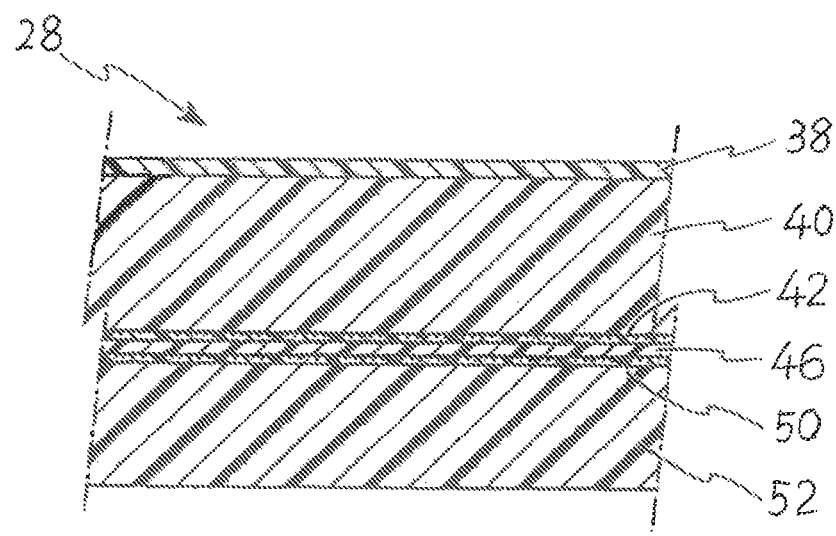
FIG. 3 is an enlarged cross-sectional view of an external wall of the fuel tank used in the embodiment of the present invention.

In the embodiment of the present invention, the fuel tank 30 is produced by blow molding, and as shown in FIG. 3, the external wall 28 includes a skin layer 38, an outer body layer 40, an outer adhesive layer 42, a barrier layer 46, an inner adhesive layer 50 and an inner body layer 52. In addition, the external wall 28 may be composed of a single layer or a plurality of layers greater than six layers.

Figure 6:
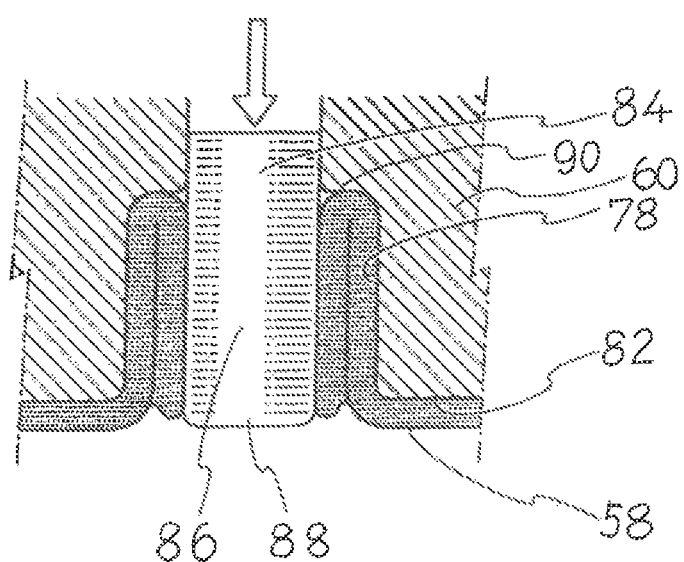
FIG. 6 shows a step in a producing method of the pipe attachment section in the embodiment of the present invention, and is a sectional view of the part of the pipe attachment section of a blowing mold when a slide pin is inserted into the part of the pipe attachment section of the blowing mold.

As shown in FIG. 6, when blow molding is performed, a cylindrical parison 58 is held with a blowing mold 60. Or the cylindrical parison 58 is opened into a flat configuration, the blowing mold 60 is opened, cavity surfaces on both sides of the blowing mold 60 adsorb the flat parison 58, and the blowing mold 60 may be united to each other after molding the flat parison 58.

In the present embodiment of the present invention, the parison 58 produced by blow molding, which includes six layers, is used. The parison 58 including six layers or more may be used. In addition, the skin layer 38 and the outer body layer 40 are respectively composed of a recycled member, and fillers, etc. are mixed in the same. The skin layer 38 can be omitted. Furthermore, when materials exhibiting rigidity and resistance to fuel are used, a single-layered parison can be used.

The skin layer 38 and the outer body layer 40 exhibit great shock resistance, and are composed of thermoplastic synthetic resins, each having rigidity against fuel oil. It is preferable to use high density polyethylene (HDPE) as the thermoplastic synthetic resins. Where the outer body layer 40 contains inorganic filler, the outer surface of the outer body layer 40 is covered thereby so that the skin layer 38 can be used without preventing the inorganic filler from projecting outside the outer surface of the outer body layer 40, thereby smoothing the outer surface of the outer body layer 40.

As described above, the exterior wall 28 of the fuel tank 30 has a multi-layer construction composed of synthetic resins. The barrier layer 46 is provided inside the exterior wall 28 to improve the rigidity and the durability of the fuel tank 30 and prevent any permeation of fuel from the exterior wall 28. The materials of the synthetic resins of the barrier layer 46, the outer body layer 40 and the inner body layer 52 differ from each other so that the outer adhesive layer 42 and the inner adhesive layer 50 are used to be strongly bonded to the barrier layer 46, the outer body layer 40 and the inner body layer 52.

The configuration of each pipe attachment section 26 in embodiments of the present invention will be explained with reference to FIGS. 4 and 5, and the method for producing each pipe attachment section 26 will be explained with reference to FIG. 6. FIG. 5 shows another embodiment of the present invention.

As shown in FIGS. 4 and 5, the pipe attachment section 26 is formed to extend into a cylindrical configuration so as to integrally continue outwardly of the exterior wall 28 of the fuel tank 30.

The pipe attachment section 26 includes an exterior side wall 54 composed of the same material as the material of the exterior wall 28 so as to integrally continue therefrom, and an interior side wall 56 composed of the same material as the material of the exterior side wall 54 so as to project from a tip end of the exterior side wall 54 and bend inwardly of the fuel tank 30 into a hairpin-like configuration inside the exterior side wall 54. The exterior side wall 54 and the interior side wall 56 are formed so as to be brought into contact and welded therewith.

Therefore, no gap exists between the exterior wall 28 of the fuel tank 30 and the pipe attachment section 26 to cause no fuel leakage, etc. In addition, the exterior side wall 54 and the interior side wall 56 of the pipe attachment section 26 can be formed into a double structure, thereby preventing any permeation of fuel from the pipe attachment section 26, and improving the rigidity of the pipe attachment section 26. As a result, pipes, etc. can be strongly attached to the pipe attachment section 26.

The exterior side wall 54 and the interior side wall 56 are integrally formed of the same material as that of the parison 58 forming the exterior wall 28 so as to have a layer construction identical to that of the exterior wall 28.

The exterior side wall 54 has at least an exterior barrier layer 62 inside the exterior side wall 54, and the interior side wall 56 has at least an interior barrier layer 64 inside the interior side wall 56, similarly.

The exterior barrier layer 62 and the interior barrier layer 64 respectively continue to a tip end of the pipe attachment section 26 so that the exterior barrier layer 62 is continuously formed with the barrier layer 46 of the exterior wall 28 of the fuel tank 30. As a result, fuel can be securely prevented from being permeated from the pipe attachment section 26.

In addition, the exterior side wall 54 has an exterior layer 66 formed outside the exterior barrier layer 62, that is outside the pipe attachment section 26, and an interior layer 68 formed inside the exterior barrier layer 62, that is inside the pipe attachment section 26.

Similarly, the interior side wall 56 has an exterior layer 70 formed outside the interior barrier layer 64, that is inside the pipe attachment section 26, and an interior layer 72 formed inside the interior barrier layer 64 opposite to the interior side wall 56.

The exterior layer 70 and the exterior layer 66 respectively continue to the tip end of the pipe attachment section 26, similarly to the exterior barrier layer 62 and the interior barrier layer 64, and the exterior layer 66 is formed to be continuous with the outer body layer 40 of the exterior wall 28 of the fuel tank 30. In addition, the interior layer 72 and the interior layer 68 continue to the tip end of the pipe attachment section 26, and the interior layer 68 is formed to be continuous with the inner body layer 52 of the exterior wall 28 of the fuel tank 30.

The interior layer 72 and the interior layer 68 of the pipe attachment section 26 are composed of the same material to each other so that the exterior side wall 54 and the interior side wall 56 can be brought into contact with each other, and the rigidity of the pipe attachment section 26 is improved without preventing any gap between the exterior side wall 54 and the interior side wall 56, thereby securely attaching pipes, etc. to the pipe attachment section 26.

It is preferable that the wall thicknesses of the total of the exterior side wall 54 and the interior side wall 56 of the pipe attachment section 26 is formed less than twice of the wall thickness of the exterior wall 28 of the fuel tank 30. In this case, when the pipe attachment section 26 is formed, the exterior side wall 54 and the interior side wall 56, which are in a molten state, are strongly pressed to each other to reduce the wall thickness thereof, thereby slightly elongating the pipe attachment section 26 axially, and bringing the exterior side wall 54 into contact with the interior side wall 56. As a result, the rigidity of the pipe attachment section 26 can be improved. Furthermore, when the exterior side wall 54 is brought into contact with the interior side wall 56, the internal diameter of the pipe attachment section 26 can be enlarged, and a flow passage inside the pipe attachment section 26 can be made large.

As shown in FIG. 4, interior wall tip ends 74 of the interior side walls 56 inwardly of the fuel tank 30 can protrude inwardly of the fuel tank 30 from an inner surface of the exterior wall 28 of the fuel tank 30. In this case, the rigidity of a root area of the exterior wall 28 of the pipe attachment section 26 can be improved, and fluid such as fuel, etc., flowing inside the pipe attachment section 26 can be smoothly flowed into the fuel tank 30.

Another embodiment shown in FIG. 5 differs from the embodiment shown in FIG. 4 in that exterior wall spools 76 are provided in the exterior side walls 54. The remaining parts in another embodiment are identical to those of the embodiment shown in FIG. 4. The exterior wall spools 76 will be explained, and the explanation of the remaining parts will be omitted.

As shown in FIG. 5, the exterior wall spool 76 protrudes from the vicinity of a tip end of the exterior side wall 54 in a direction of an external diameter of a periphery thereof.

The exterior wall spool 76 can be formed so as to protrude from an outer surface of the exterior side wall 54 by approximately 1 mm, for example. In addition, the length in a longitudinal direction of the exterior wall spool 76 can be provided to approximately 5 mm, and such length of the exterior wall spool 76 can be suitably adjusted.

Since the exterior wall spools 76 are provided, pipe members can be difficult to be removed where these pipe members such as filler pipes, etc. are attached to the pipe attachment section 26.

The method for forming the pipe attachment section 26 in the exterior wall 28 will be explained with reference to FIG. 6.

As shown in FIG. 6, an attachment molding section 78 having a cylindrical configuration is provided so as to be recessed inwardly of the blowing mold 60 from a cavity surface 82 of the blowing mold 60. The internal diameter of the attachment molding section 78 is identical to the external diameter of the pipe attachment section 26.

In addition, a slide pin 84 capable of sliding inside a mold cavity is provided by way of the cavity surface 82 of the blowing mold 60 from the interior of the attachment molding section 78. The external diameter of a main body 86 of the slide pin 84 is identical to the internal diameter of the pipe attachment section 26. A tip end 88 of the slide pin 84 has a sharpened configuration.

When the external wall 28 is molded, the parison 58 is pressed with the cavity surface 82 of the blowing mold 60 by blowing. At this time, the slide pin 84 enters inwardly of the mold cavity from the cavity surface 82. The depth of the slide pin 84 entering inwardly of the mold cavity is approximately twice that of the attachment molding section 78. As a result, the parison 58 is pressed around the slide pin 84 entering the mold cavity.

Next, the slide pin 84 is slided from the attachment molding section 78 into an interior of the blowing mold 60, or downwardly is slided in FIG. 6. As a result, the parison 58 enters along an inner surface of the attachment molding section 78 with the sliding of the slide pin 84, and contacts a bottom 90 of the attachment molding section 78 to be reversed. Consequently, the parison 58 pressed against the inner surface of the attachment molding section 78 moves along the inner surface of the attachment molding section 78 to define double layers of the parison 58.

Furthermore, the slide pin 84 enters the interior of the attachment molding section 78, again. As a result, the double layers of the parison 58 including the exterior side wall 54 and the interior side wall 56 can be pressed against the inner surface of the attachment molding section 78 with the main body 86 of the slide pin 84, and the double layers of the parison 58 can be strongly pressed against each other to be brought into close contact with each other. Consequently, the pipe attachment section 26 can be molded, and the exterior side wall 54 and the interior side wall 56 can be molded into close contact with each other.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A pipe attaching structure of a fuel tank, the pipe attaching structure comprising:
   a pipe attachment section adapted to attach pipes to an exterior wall of the fuel tank,
   wherein the fuel tank includes the pipe attachment section extending outwardly of the fuel tank so as to be integral with the exterior wall of the fuel tank,
   wherein the pipe attachment section includes:
      an attaching exterior wall including a same material as a material of the exterior wall of the fuel tank so as to elongate into a cylindrical configuration and to continue integrally with the exterior wall of the fuel tank outwardly thereof;
      an attaching interior wall formed inside the attaching exterior wall so as to continue from a tip end of the attaching exterior wall and bend like a hairpin, the attaching exterior wall and the attaching interior wall being brought into contact with each other; and
      a barrier layer disposed inside of the exterior wall of the fuel tank and continuously extending from a tip end of the pipe attachment section, where the pipe attachment section extends outwardly from the fuel tank, to an inside of the attaching interior wall.

2. The pipe attaching structure of the fuel tank according to claim 1, wherein a wall thickness of a total of the attaching exterior wall and the attaching interior wall of the pipe attachment section is less than twice of a wall thickness of the exterior wall of the fuel tank.

3. The pipe attaching structure of the fuel tank according to claim 1, wherein an interior side of the attaching interior wall protrudes inwardly of the fuel tank from an inner surface of the exterior wall of the fuel tank.

4. The pipe attaching structure of the fuel tank according to claim 1, wherein the attaching exterior wall of the pipe attachment section includes a spool which protrudes in a direction of an external diameter of the attaching exterior wall in a periphery thereof.

5. The pipe attaching structure of the fuel tank according to claim 1, wherein the exterior wall of the fuel tank includes a multi-layer structure of synthetic resins, the multi-layer structure including the barrier layer that extends inside of the exterior wall of the fuel tank.

6. The pipe attaching structure of the fuel tank according to claim 1, wherein the barrier layer extends inside of the attaching exterior wall and inside of the attaching interior wall.

7. The pipe attaching structure of the fuel tank according to claim 1, wherein the attaching exterior wall comprises:
   an exterior layer contacting the barrier layer, with respect to the barrier layer, the exterior layer extending toward an outside of the pipe attachment section; and
   an interior layer contacting the harrier layer, with respect to the barrier layer, the interior layer extending toward an inside of the pipe attachment section.

8. The pipe attaching structure of the fuel tank according to claim 7, wherein the attaching interior wall comprises:
   another exterior layer contacting the barrier layer, with respect to the barrier layer, said another exterior layer extending toward the outside of the pipe attachment section; and another interior layer contacting the barrier layer, with respect to the barrier layer, said another interior layer extending toward the inside of the pipe attachment section.

9. The pipe attaching structure of the fuel tank according to claim 8, wherein the barrier layer continuously extends from the tip end of the pipe attachment section to an area between the exterior layer and the interior layer.

10. The pipe attaching structure of the fuel tank according to claim 9, wherein the barrier layer further continuously extends from the area between the exterior layer and the interior layer to an area between said another exterior layer and said another interior layer.

11. The pipe attaching structure of the fuel tank according to claim 1, wherein the exterior wall of the fuel tank comprises:
    an outer adhesive layer disposed on a first surface of the barrier layer; and
    an inner adhesive layer disposed on a second surface of the barrier layer opposing the first surface of the bather layer.

12. The pipe attaching structure of the fuel tank according to claim 11, wherein the exterior wall of the fuel tank further comprises:
    an outer body layer disposed on a surface of the outer adhesive layer.

13. The pipe attaching structure of the fuel tank according to c 12, wherein the exterior wall of the fuel tank further comprises:
    a skin layer disposed on a surface of the outer body layer.

14. The pipe attaching structure of the fuel tank according to claim 13, wherein the exterior wall of the fuel tank further comprises:
    an inner body layer disposed on a surface of the inner adhesive layer.

15. A fuel tank, comprising:
    an exterior wall; and
    a pipe attachment section configured to attach pipes to an exterior wall,
    wherein the pipe attachment section includes:
        an attaching exterior wall elongating into a cylindrical configuration and continuing integrally with the exterior wall of the fuel tank;
        an attaching interior wail disposed inside the attaching exterior wall to continue from a tip end of the attaching exterior wall, the attaching exterior wall and the attaching interior wall contacting with each other; and
        a barrier layer disposed inside of the exterior wall of the fuel tank and continuously extending from a tip end of the pipe attachment section, where the pipe attachment section extends outwardly from the fuel tank, to an inside of the attaching interior wall, and
    wherein, the exterior wall of the fuel tank comprises:
        an outer adhesive layer disposed on a first surface of the barrier layer;
        an inner adhesive layer disposed on a second surface of the barrier layer opposing the first surface of the barrier layer;
        an outer body layer disposed on a surface of the outer adhesive layer;
        a skin layer disposed on a surface of the outer body layer; and
        an inner body layer disposed on a surface of the inner adhesive layer.

16. A fuel tank, comprising:
    an exterior wall; and
    a pipe attachment section configured to attach pipes to an exterior wall,
    wherein the pipe attachment section includes:
        an attaching exterior wall elongating into a cylindrical configuration and continuing integrally with the exterior wall of the fuel tank;
        an attaching interior wall disposed inside the attaching exterior wall to continue from a tip end of the attaching exterior wall, the attaching exterior wall and the attaching interior wall contacting with each other; and
        a barrier layer disposed inside of the exterior wall of the fuel tank and continuously extending from a tip end of the attachment section, where the pipe attachment section extends outwardly from the fuel tank, to an inside of the attaching interior wall, and
    wherein the attaching exterior wall comprises:
        an exterior layer contacting the barrier layer, with respect to the barrier aver, the exterior layer extending toward an outside of the pipe attachment section; and
        an interior layer contacting the barrier layer, with respect to the barrier layer, the interior layer extending toward an inside of the pipe attachment section.

17. The fuel tank according to claim 16, wherein the attaching interior wall comprises:
    another exterior layer contacting the barrier layer, with respect to the barrier layer, said another exterior layer extending toward the outside of the pipe attachment section; and
    another interior layer contacting the barrier layer, with respect to the barrier layer, said another interior layer extending toward the inside of the pipe attachment section.

18. The fuel tank according to claim 17, wherein the barrier layer continuously extends from the tip end of the pipe attachment section to an area between the exterior layer and the interior layer.

19. The fuel tank according to claim 18, wherein the barrier layer further continuously extends from the area between the exterior layer and the interior layer to an area between said another exterior layer and said another interior layer.

* * * * *